No. 837,956. PATENTED DEC. 11, 1906.
J. H. PENNICK.
AUTOMATIC WEIGHING AND SACKING MACHINE.
APPLICATION FILED NOV. 23, 1905.
2 SHEETS—SHEET 1.
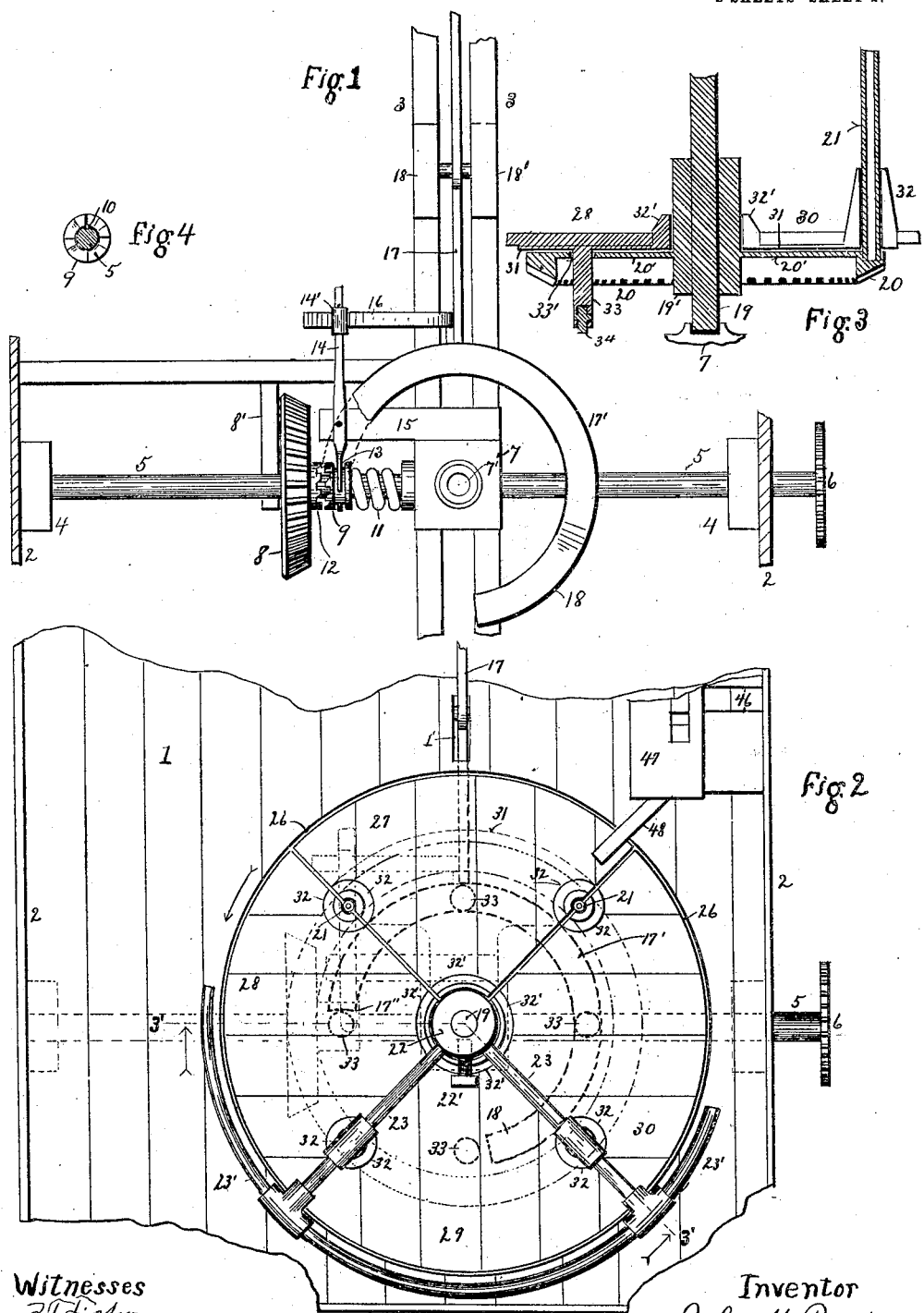
Witnesses
J. T. Fisher
J. J. Rosen
Inventor
John H. Pennick
By J. A. Rosen
atty

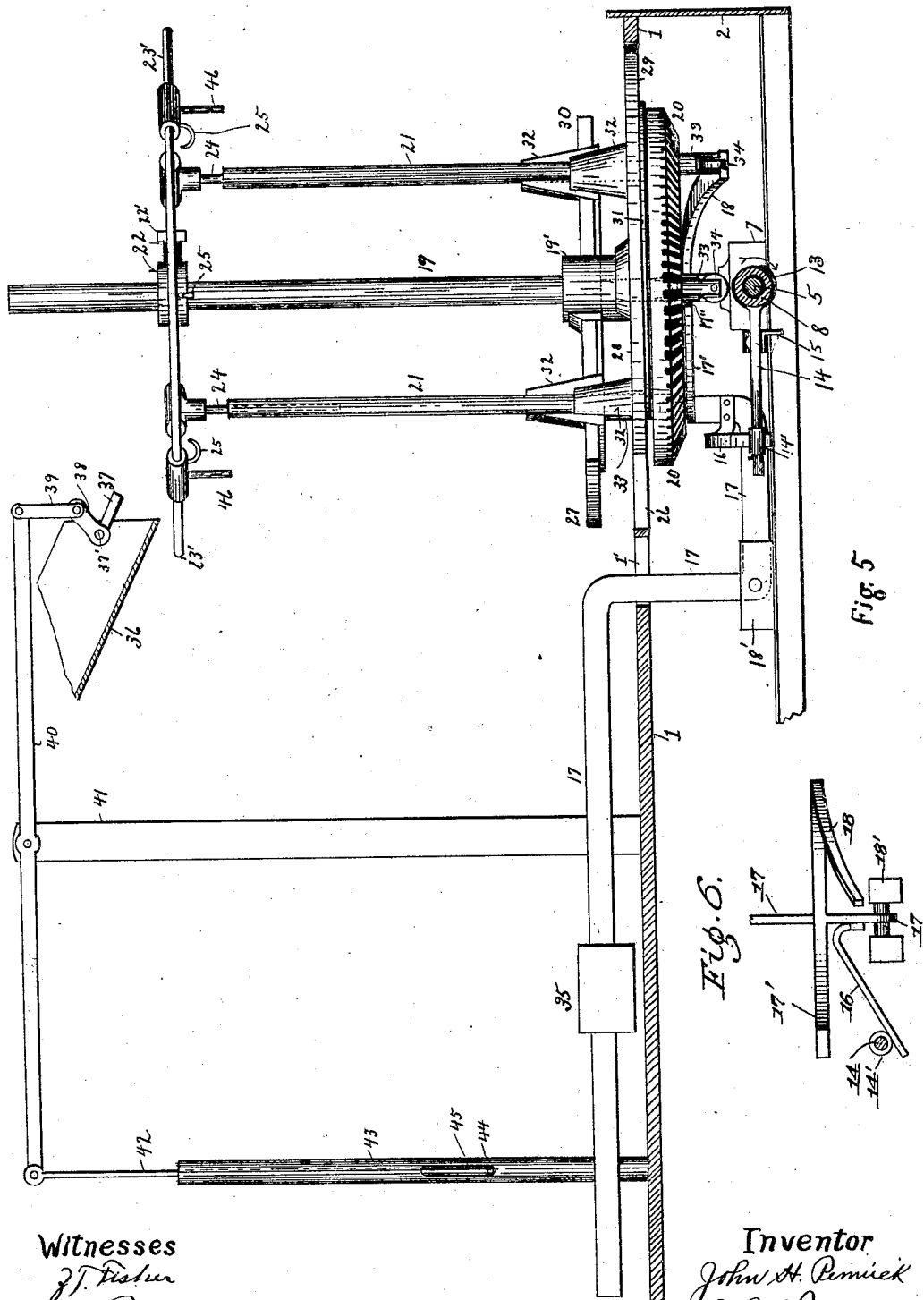

UNITED STATES PATENT OFFICE.

JOHN H. PENNICK, OF MENOKEN, KANSAS.

AUTOMATIC WEIGHING AND SACKING MACHINE.

No. 837,956.      Specification of Letters Patent.      Patented Dec. 11, 1906.

Application filed November 23, 1905. Serial No. 288,681.

*To all whom it may concern:*

Be it known that I, JOHN H. PENNICK, a citizen of the United States, and a resident of Menoken, in the county of Shawnee and State of Kansas, have invented new and useful Improvements in Automatic Weighing and Sacking Machines, of which the following is a specification.

The object of the invention is to provide an apparatus to be used in connection with potato and other harvesting machines and elsewhere, which will hold the sacks while being filled with the product, automatically weigh them, and automatically discharge and bring under the feed-chute the filled and empty sacks, respectively.

Further objects are to improve generally upon automatic weighing-machines, and specially, as will hereinafter be pointed out, to improve generally upon the sackers, as will be hereinafter specified, and, further, to provide the various details of mechanism herein described and claimed.

The invention consists of the parts, improvements, and combinations herein described and claimed.

In the drawings accompanying and forming part of this specification, and in the description thereof, I illustrate the invention in its preferred form and show what I deem to be the best mode of applying the principles thereof; but it is to be understood that the invention itself is not confined to the drawings and the description of the drawings; that it may be applied to other uses; that parts and combinations thereof as separately claimed may be used in connection with other devices of like general nature, and that I contemplate changes in form, proportions, materials, arrangement, the transposition of parts, and the substitution of equivalent members without departing from the spirit of the invention.

Under date of November 2, 1905, I have executed the application-papers for a patent for a potato-harvester, in which application I show the harvester-frame provided at one side with a platform which is designed to support an automatic weighing and sacking machine. The present drawings show my present invention as supported on such a platform and used in connection with a potato-harvester, although it will be readily understood that my present invention is intended to be used elsewhere as well as in connection with a potato-harvester.

Figure 1 is a plan view of the lower portions of the mechanisms of the machine, the upper portions being removed and the trip end of the scale-beam or balance-beam being shown as partially broken away to disclose the parts under it, but said broken-away part being shown in dotted outline. Fig. 2 is a top or plan view of the apparatus as a whole, certain minor portions being broken away and the frame-platform being partially broken away. Fig. 3 is a vertical section taken through the line 3' 3' of Fig. 2. Fig. 4 is a sectional view showing one member of the clutch. Fig. 5 is a side elevation view of the apparatus as a whole, the frame-platform being shown in section. Fig. 6 is an end view of the scale-beam and runway looking from right to left in Fig. 5, with a section of the clutch-operating lever, and is designed to show especially the obliquely-disposed arm whereby said lever is operated.

Like reference-numerals indicate like or corresponding parts throughout the several views.

A platform 1 is provided of sufficient size to support the apparatus and also an attendant and having suitable side and end pieces 2 2 2. Two beams, preferably of angle-iron, extend underneath the platform, as shown at 3 3. Also extending under the platform and having bearings in the boxings 4 4 is the main driving-shaft 5, to which is secured the gear or sprocket wheel 6, by which the apparatus is driven and which during the working of the apparatus rotates constantly and in the direction indicated by the arrow in Fig. 5. Mounted on the angle-irons 3 3 where the shaft 5 crosses them is a block or shaft-bearing 7, having the socket 7', in which the shaft 19, hereinafter explained, is seated rotatably. Loosely mounted on the shaft is a bevel-gear 8, which may be held against motion lengthwise of the shaft by any suitable means, as by a buffer or rod 8', and secured to the gear is one member 12 of a clutch, the other member 9 of which is grooved and is keyed at 10 onto the shaft, but movable lengthwise thereon. 11 is a compression-spring tending naturally to force the two members into engagement with each other. 13 is a collar working in said groove and being one end of a lever 14, pivoted onto a rod or bracket, as of angle-iron, secured to the central pivot-block 7, as indicated by 15. The other end of said lever is provided with a roller 14', against which works the obliquely-disposed arm 16, extending from the balance or scale beam 17. Normally the arm 16, being in elevated position, as shown in the drawings, forces the lever and the member 9 of the clutch against the tension of the spring 11, thereby permitting the shaft 5 to rotate without rotating the gear 8; but when said scale-beam is depressed the outer end of the lever 14 is permitted to travel to the right, as viewed in Fig. 1, thereby permitting the spring 11 to force the member 9 into engagement with the other member 12, thereby causing the gear to rotate with the shaft.

The balance-beam 17 is pivoted to the blocks 18', located on the beams 3 3. From the pivot it extends upwardly through a slot 1' in the frame-platform, and thence rearwardly, where it is provided with a suitable weight 35, movably mounted thereon. The forward end of the balance-beam is shaped into circular form 17', extending from the point 17'' and terminating at the other end in a slanting surface. This end, which I call the "trip" end, constitutes a runway for rollers supporting the weighing-platforms of sack-stools, as will be hereinafter described.

Seated in the socket 7' of the central block 7 is the central shaft or standard 19, provided with a hub 19' and a large horizontally-disposed bevel-gear 20, having the web 20'. A number of standards, preferably made of gas-pipe, are secured to said gear, as shown at 21, and these are preferably four in number and arranged equally distant from the center and arranged equally distant around the rim of the gear. A collar 22 is adjustably secured to the central standard 19 by a set-screw 22', and extending radially therefrom to the standards 21 21 are the rods 23 23, which also extend beyond said standards and support the circular railing 23'. The rods 23 23 may be movably connected with the gas-pipe standards 21 21 by the smaller rods 24 24, respectively, which arrangement permits of the vertical adjustment of the upper supporting-frame for the sacks of different lengths. Suitable hooks 25 25 may be provided, whereby to fasten the open end of the sacks to the upper frame. It will be understood that the circular space within the railing 23' is divided into four quarters by the rods 23 23 and that each such quarter is intended to hold a sack.

The frame-platform 1 has a circular opening 26, concentric with shaft 19, and in this opening are located the weighing-platforms or sack-stools now to be described. There are four of these sack-stools 27, 28, 29, and 30, all together corresponding to the space within the upper railing 23', and each corresponds to one of the quarters above described—that is, they are divided so that their division-lines extend radially from the central shaft to and beyond the middle of the standard 21, as clearly shown in Fig. 2. While these parts would perhaps be weighing-platforms or scale-platforms, I prefer to call them "sack-stools" in order to prevent confusion with the main-frame platform. Under each sack-stool and as part thereof is a casting 31, from which extends up a half-sleeve 32, whereby the opposite sides of each standard 21 are embraced, while a shorter quarter-sleeve 32' similarly embraces the hub 19'. These permit the up-and-down movement of the several sack-stools without material dragging to perform their proper function. Extending downwardly from each sack-stool is a rod 33, having a small roller 34 at its lower end. These rollers and rods are located immediately above the trip or runway end of the scale-beam, as clearly indicated in the heavier dotted outlines in Fig. 2, the rods being extended movably through holes 33' in the web of the large gear 20. In the drawings the rollers for the sack-stools 30 and 27 are upon the runway, while the rollers for the sack-stools 28 and 29 are off the runway. The parts are so disposed, as shown, that when a sack-stool has its roller upon the runway it is raised up (see 27 and 30 in Fig. 5) above the main platform 1; but when the sack-stool has its roller off the runway it is permitted to drop down upon the gear 20 and even with the main platform. (See 28 and 29, same figure.) The slanting end 18 of the runway allows the roller engaging it to pass up onto the said runway by reason of the rotation of the gear carrying with it said sack-stools.

36 is a chute through which the product, as potatoes, is fed into the sacks, and inasmuch as I contemplate the best use of my invention to be in connection with a harvesting or other machine where there is a constant feed I provide mechanism for shutting off the feeding while a filled sack is being carried away from under the chute and an empty sack brought thereunder, which mechanism is preferably as follows: A trap or shutter 37 is pivoted at 37' to the lower end of the chute and is provided with a crank-arm 38, which is connected by a link 39 with a walking beam or lever 40, pivoted suitably, as to a standard 41 in the frame. The other end of the lever 40 is pivoted to a rod 42, which extends down through the hollow standard 43, which is slotted at 45, allowing the lower end 44 of the rod 42 to extend out therethrough and into the path of the rear end of the balance-beam 17. Normally the trap 37 is open; but when the forward end of the balance-beam is depressed, thereby raising the rear end, said rear end engages the lower end 44 of rod 42 and raises it, thereby closing the door 37 until the rear end of the scale-beam shall be again lowered, when the heavier weight of the rod 42 will open the trap 37 again.

Having now described the mechanism in detail and the operation of the several parts, it only remains to explain the operation of the apparatus as a whole. The shaft 5 rotates constantly, but is kept out of gear with the weighing apparatus by reason of the clutch. The weight 35 is adjusted so that it will take a certain weight in the sack or on the sack-stool to raise said weight. For instance, say it is set at one hundred pounds. The attendant fastens a sack by the hooks 25 25 over each sack-stool, so that the bottom rests on said stool and so that the weight of the product in the sack will rest on said stool in both positions. Now suppose a sack to be in each quarter or on each stool, as just described, and let the feeding through chute 36 commence. Now so long as the weight upon the stool is less than the one hundred pounds the weight will hold the sack-stool in raised position, (it being understood that the product is being fed into the sack on the stool 27;) but as soon as the one hundred pounds of potatoes have been fed into the sack on said stool the stool 27 will fall by reason of such weight, carrying under it the trip end of the scale-beam and depressing the arm 16, which immediately brings the two members of the clutch together, thereby causing the gears to turn, and with the large gear 20 the entire structure above it also rotates. Also, as described, the trap 37 of the feed-chute is closed. The rotation of the gears and apparatus above it continues with the roller of stool 27 running on the depressed runway until the end 17″ is reached, whereupon as the said roller moves off said end the said trip end being relieved of said load caused by the filled sack is immediately raised up again by the weight 35, and this operation also has the effect of releasing the clutch and again opening the shutter 37, as explained, whereupon the sack upon stool 30 will then be filled and the operation will continue in this manner indefinitely. The operator then removes the filled sack from stool 27 and puts in an empty one in its stead—a duty which he can easily perform while the next sack is being filled and without interfering with the operation of the apparatus. By stopping the chute during the changing of the position of the sack-stools I can get an accurate weight and can prevent spilling of the product. Of course when the filled sack on the stool being presently filled carries the trip end of the balance-beam down the next succeeding stool also goes down and its roller runs around on the depressed runway; but this is immaterial, as this next stool is carried to elevated position immediately upon the filled sack-stool passing off the end of the runway, which of course stops the gears and apparatus with said second sack in place for filling. In this manner the sacks upon the sack-stools are brought one at a time under the feeding-chute and are each filled to the predetermined weight, all being done automatically, except that the attendant shall place the sacks in the apparatus and remove the filled sacks therefrom. By moving the collar 22 and its connections up or down the apparatus may be adjusted to any size of sack, and by shifting the weight 35 the apparatus may be set to trip at any desired weight.

What I claim as new, and desire to secure by Letters Patent, is—

1. The combination of a frame, a balance-beam pivoted therein, an adjustable weight on one end of the beam, and a runway on the other end describing a partial circle; a central bearing, a standard pivoted thereon, a gear-wheel secured to the standard, an upright framework secured on the gear-wheel; a constantly-rotating driving-shaft, a gear mounted loosely thereon and meshing with the first-named gear and secured to one member of a clutch, the other member of the clutch keyed to the shaft and movable lengthwise thereon, an operating-lever therefor controlled by the balance-beam and a counteracting spring; a series of sack-stools or weighing-platforms loosely supported on the gear-wheel first named, and adapted during part of the rotation of the gear to be supported upon the runway.

2. The combination of a frame, a balance-beam pivoted therein, an adjustable weight on one end of the beam, and a runway on the other end describing a partial circle and coöperating with said balance-beam; a central bearing, a standard pivoted thereon, a gear-wheel secured to the standard, an upright framework secured on the gear-wheel; a constantly-rotating driving-shaft; a clutch mechanism between the shaft and the gear-wheel operable by the balance-beam; and a series of sack-stools or weighing-platforms loosely supported on the gear-wheel and adapted during part of the rotation of the gear-wheel to be supported upon the runway.

3. The combination of a balance-beam, a frame, a weight on one end of the balance-beam, a runway on the other end of the balance-beam and made integral with said balance-beam, a series of sack-stools supported in succession on said runway, suitable gearing for driving said stools over said runway, a constantly-rotating shaft, and a clutch coöperating with the balance-beam for connecting said shaft with said gearing.

4. The combination of a frame, a scale-beam pivoted therein, an adjustable weight on one arm of the scale-beam, a runway on the other end of the scale-beam and integral therewith; a pivoted carrier and driving mechanism therefor and a clutch between the carrier and the driving mechanism and coöperating with the scale-beam, a series of sack-stools in said carrier adapted to rest at times upon the runway, a feed-chute and a trap therefor and suitable mechanism between the scale-beam and the trap for closing and opening said trap by the operation of the scale-beam.

5. The combination of a frame, a pivoted balance-beam therein, a runway connected with the balance-beam and an adjustable weight, a series of sack-stools supported in rotation upon the runway, a carrier for moving said stools onto, along upon, and off of the runway, a driving-shaft, a driving-gear loosely mounted thereon, and comprising one member of a clutch, the other member of the clutch keyed to the shaft and movable lengthwise thereon, and an operating-lever for the clutch controlled by the balance-beam.

In testimony whereof I have hereunto signed my name in the presence of subscribing witnesses.

JOHN H. PENNICK.

Witnesses:
 Z. T. FISHER,
 JOHN A. HULIT.